UNITED STATES PATENT OFFICE.

HAYDN M. BAKER, OF BROOKLYN, NEW YORK.

COMPOSITION FOR COMBUSTIBLE BRIQUETS.

SPECIFICATION forming part of Letters Patent No. 446,505, dated February 17, 1891.

Application filed March 18, 1890. Serial No. 344,394. (No specimens.)

*To all whom it may concern:*

Be it known that I, HAYDN M. BAKER, a citizen of the United States, residing at Brooklyn, in the county of Kings and State of New York, have invented new and useful Improvements in Compositions for Combustible Briquets, of which the following is a specification.

My invention relates to that class of compositions of matter commonly known as "combustible briquets" adapted for use as artificial fuel.

It is my object to provide a briquet having a high degree of tensile strength, capable of resisting disintegration by wet or dampness, and burning when dry with great readiness and uniformity, and yielding an intense heat, the compound being produced at low cost and having an increasing economic value.

My invention consists in the novel composition of matter hereinafter fully set forth, and then definitely pointed out in the claim annexed to this specification.

To enable others skilled in the art to practice my invention, I will describe the same in detail.

In carrying the process of manufacture into effect I make use of any suitable quantity of coal-dust or culm, for which I may substitute sawdust or other organic material. To said material I add and intimately mingle therewith a dense aqueous solution containing about one per cent., by weight, of dry disilicate or trisilicate of sodium or potassium, or a mixture of both, ranging in specific gravity from 30° to 65° Baumé. In cases where from the nature of the organic material or other causes an aid to combustion is desirable or necessary I may add to the silicate solution an aqueous solution of an alkaline nitrate. I may, however, substitute for the nitrate solution one of the alkaline, earthy, or metallic permanganates equivalent in the dry state to from one per cent., up to two and one-half per cent., by weight, of the material to be cemented. The silicate solution confers upon the organic material the necessary adhesive quality, and when an aqueous solution of an alkaline silicate of the density described is mingled with coal-dust or sawdust and the mixture submitted to energetic pressure in molds suitable for the purpose the mass coheres with considerable intensity and retains the form of the mold in which the compression takes place; but after the water has evaporated out of the silicate solution the tensile strength becomes greatly increased and the silicate becomes insoluble upon exposure, thereby preventing subsequent disintegration through contact with water. The nitrate of permanganate facilitates and sustains the combustion of the briquet, but need be used only when the circumstances of the case require it. When used, they will enter into the compound in substantially the proportions named, which will be varied within economic limits, according to the requirements of each case. After removal from the molds the compressed briquets are dried in any suitable manner—as, for example, by the temperature of the surrounding atmosphere or by baking in a room subject to a regulated application of artificial heat.

What I claim is—

The composition of matter described, consisting of finely-divided organic waste, a di or tri silicate of sodium in aqueous solution and of a specific gravity from 30° to 65° Baumé, and an alkaline nitrate or its described equivalent, substantially as described.

In testimony whereof I affix my signature in presence of two witnesses.

HAYDN M. BAKER.

Witnesses:
EWELL A. DICK,
CHAS. B. TILDEN.